United States Patent
Aramaki (10) Patent No.: US 6,635,374 B1
(45) Date of Patent: Oct. 21, 2003

(54) WATER SUPPLY SYSTEM FOR A FUEL CELL VEHICLE

(75) Inventor: Kazuyoshi Aramaki, Kanagawa-ken (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 09/563,853

(22) Filed: May 4, 2000

(30) Foreign Application Priority Data

May 6, 1999 (JP) .......................................... 11-126024

(51) Int. Cl.$^7$ ................................................ H01M 8/04
(52) U.S. Cl. .............................. 429/24; 429/22; 429/25
(58) Field of Search ................................ 429/22–26, 13

(56) References Cited

U.S. PATENT DOCUMENTS

| | | | | |
|---|---|---|---|---|
| 3,775,186 A | * | 11/1973 | Cheron | ........................ 429/20 |
| 4,738,903 A | * | 4/1988 | Garow et al. | .................. 429/17 |
| 5,432,020 A | * | 7/1995 | Fleck | ........................... 429/13 |
| 5,786,104 A | * | 7/1998 | Black et al. | ................ 180/65.3 |
| 6,013,385 A | * | 1/2000 | DuBose | ........................ 429/17 |
| 2002/0177017 A1 | * | 11/2002 | Nelson et al. | ................. 429/22 |

* cited by examiner

Primary Examiner—Randy Gulakowski
Assistant Examiner—Jonathan Crepeau
(74) Attorney, Agent, or Firm—Foley & Lardner (57) ABSTRACT

The quantity of water supplied when injecting water from a water tank (22) into a duct (10) is adjusted by a water supply valve (11a) and air is taken in from the duct after water induction. The air is compressed by a compressor (7), and the delivered air from the compressor (7) is cooled by an after-cooler (13), the cooled air being supplied to a fuel cell (8). A control unit calculates a demanded quantity of water (Ry) for the fuel cell (8) based on the flow rate (R), the pressure (P) and the temperature (T) of the compressed air supplied to the fuel cell (8), and accordingly performs control of the water supply valve (11a) so as to achieve this quantity of demanded water (Ry).

10 Claims, 7 Drawing Sheets

WATER SUPPLY SYSTEM FOR A FUEL CELL VEHICLE

BACKGROUND OF THE INVENTION

The present invention relates to a water supply system for a fuel cell, for supplying compressed air having an ideal humidity for the fuel cell.

Figure 8:
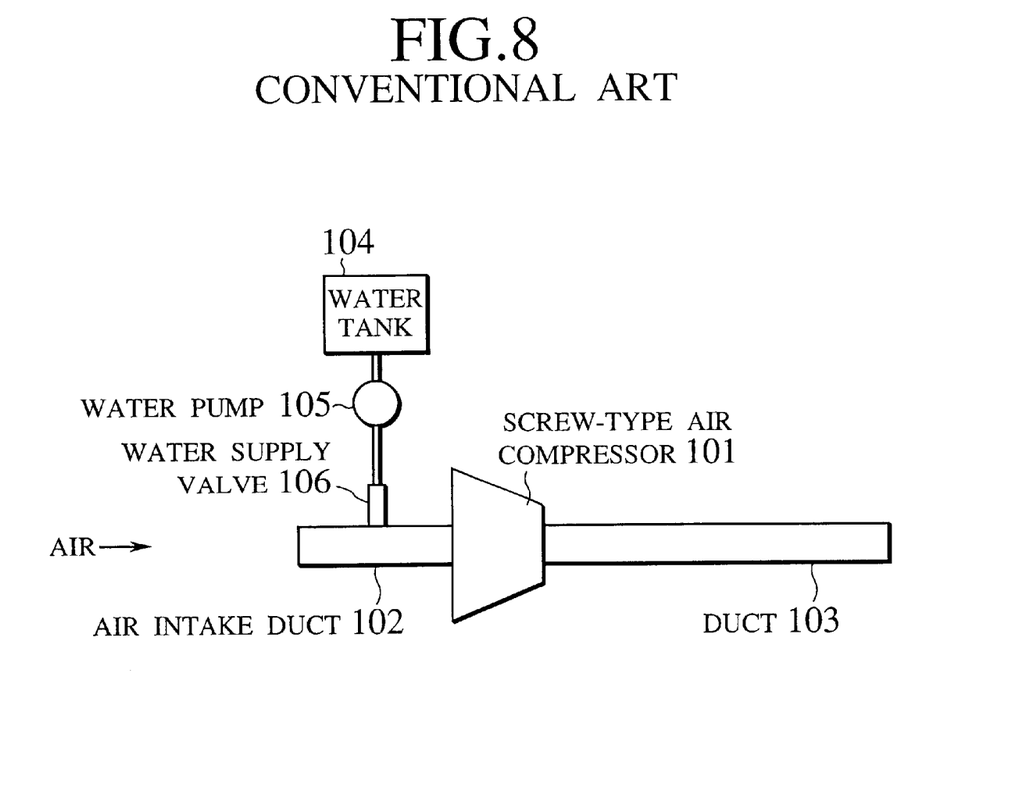
FIG. 8 is a block diagram of a conventional water supply system for a fuel cell.

FIG. 8 shows a known screw-type air compressor.

In this compressor, water flowing in from a water tank 104 is pressurized by a water pump 105, and water is mixed from water supply valve 106 into an intake duct 102 positioned upstream of a screw-type air compressor 101, having a reduced leakage of compressed air at gaps in the screw within the air compressor 101, so that the volumetric efficiency is improved, wasteful air compression is reduced, and the compression work due to latent heat of water vaporization is reduced, whereby the adiabatic compression efficiency is improved.

SUMMARY OF THE INVENTION

However, leakage paths of the air compressor 101 are sealed, and a large quantity of water is supplied to improve the adiabatic compression efficiency.

In application to a fuel cell system, therefore, water flows directly into the fuel cell, causing condensation due to an internal temperature of the fuel cell, and water can collect in air flow paths within the fuel cell, thereby interfering with the flow of air and reducing the generating efficiency of electrical power of the fuel cell.

The present invention is made with such points in view. It therefore is an object of the invention to provide a water supply system for a fuel cell, which achieves not only highly precise control of humidity, but also the maximum possible electrical power generating efficiency.

An aspect of the present invention to achieve the object is a water supply system for a fuel cell, comprising a water supply valve responsible for a supply quantity of water to be injected from a water tank into an air intake path, a compressor compressing air taken from the air intake path after the water injection, a cooler cooling compressed air delivered from the compressor to supply cooled air to the fuel cell, a set of detectors detecting a flow rate, a pressure and a temperature of compressed air to be supplied to the fuel cell, a water quantity calculator calculating a necessary water quantity for the fuel cell based on a detected flow rate, pressure, and temperature of the compressed air to be supplied to the fuel cell, and a water quantity controller controlling the water supply valve to supply the necessary water quantity.

According to this aspect, a quantity of water to be injected to the air intake path from the water tank is supplied through a water supply valve, air is taken in from the intake path and compressed after water injection, air delivered from the compressor is cooled, and the cooled air is supplied to the fuel cell, an ideally demanded quantity of water for the fuel cell is calculated based on a detected flow rate, pressure, and temperature of compressed air to be supplied to the fuel cell, and the water supply valve is controlled so as to achieve this quantity of water, thereby achieving highly precise humidity control and also achieving the maximum possible electrical generating efficiency.

BRIEF DESCRIPTION OF THE ACCOMPANYING DRAWINGS

The above and further objects and novel features of the present invention will more fully appear from the following detailed description when the same is read in conjunction with the accompanying drawings, in which.

DETAILED DESCRIPTION OF THE PREFERRED EMBODIMENTS

Preferred embodiments of the present invention are described in detail below, with reference made to relevant accompanying drawings. Like elements are designated by like reference characters.

Figure 1:
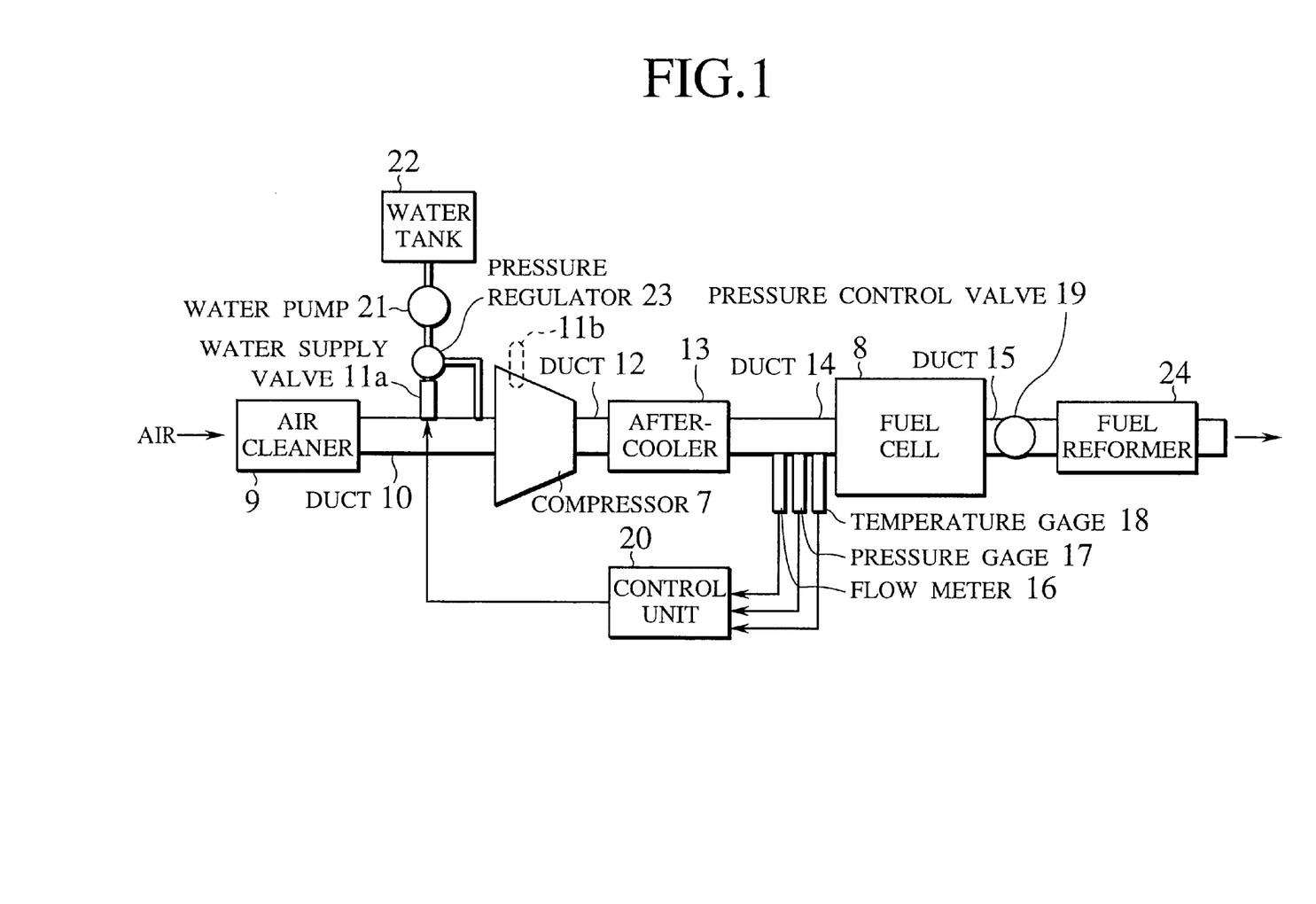
FIG. 1 is a block diagram showing fuel cell system in which a water supply system according to the first embodiment of the present invention is installed.

In FIG. 1, illustrating the first embodiment of the present invention, air passes through an air cleaner 9 to remove dust, after which it flows from a duct 10 into the compressor 7. Air compressed by the air compressor 7 reaches a maximum of 200° C., passes from a duct 12 through an after-cooler 13, thereby having its temperature reduced, and flows from a duct 14 into a fuel cell 8.

The fuel cell 8 is controlled to an internal temperature of 90 to 80° C., and air leaving the fuel cell 8 passes from a duct 15 to a pressure adjustment valve 19, and is delivered from the fuel reformer into the atmosphere.

The flow rate, pressure, and temperature of compressed air flowing into the fuel cell 8 are detected by a flow meter 16, a pressure gage 17, and by a temperature gage 18, respectively. The flow meter 16, pressure gage 17, and temperature gage 18 are connected to a control unit 20 for controlling the fuel cell 8, the measurement signals from each gage being output to the control unit 20.

The control unit 20 internally has a control ROM into which are stored a control program and a demanded humidity map, and a RAM serving as a working area for performing control, calculates the ideal quantity of water supply, based on the measurement signals from the flow meter 16, the pressure gage 17, and the temperature gage 18, and outputs an control signal to the water supply valve 11a, responsive to the result of this calculation.

The water supply valve 11a is provided in the duct 10 disposed upstream of the compressor 7, water stored in a water tank 22 is pressurized by a water pump 21, a proper pressure is maintained by a pressure regulator 23, and water is mixed with air within the duct 10 by means of the water supply valve 11a. The water supply valve 11a, as shown in FIG. 1, can be mounted directly to the compressor 7.

Figure 2:
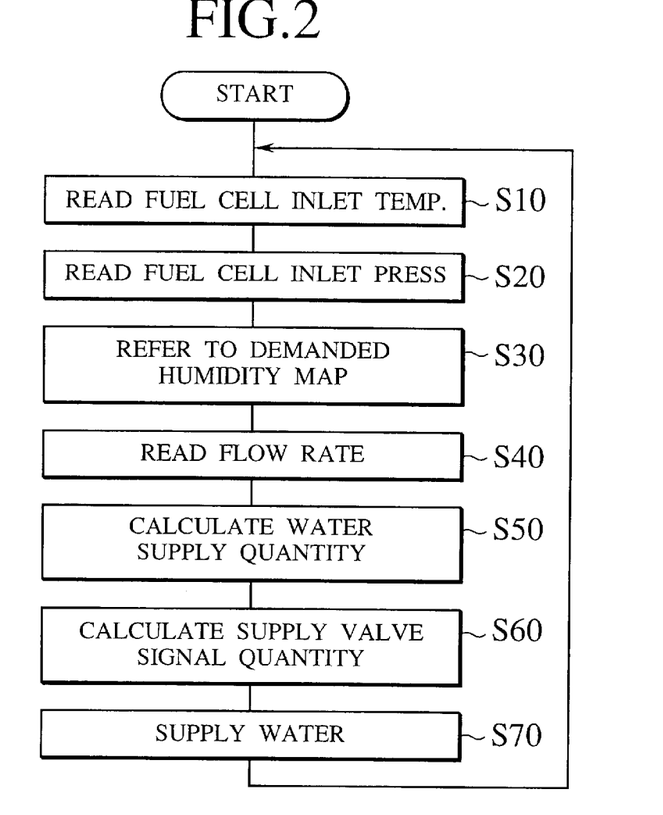
FIG. 2 is a flowchart illustrating the control operation in a water supply system according to the first embodiment of the present invention.
Figure 3:
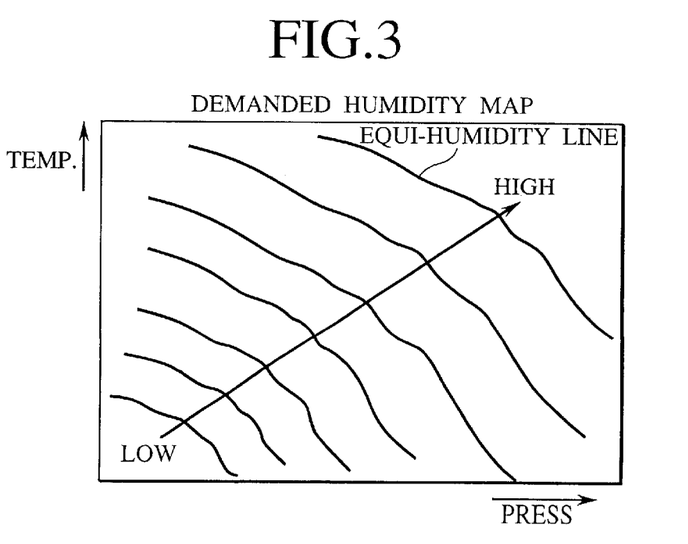
FIG. 3 is a conceptual drawing showing a demanded humidity made for an ideal humidity.

The control operation of this water supply system according to the control flowchart of FIG. 2 is described below, with reference made to the demanded humidity map for an ideal humidity. The flowchart and humidity map shown in FIG. 2 and FIG. 3 are stored in the ROM of the control unit 20 as a control program and a data table.

First, at step S10, the control unit 20 reads in the temperature T of the compressed air from the temperature gage 18 provided at the air intake of the fuel cell 8. Then, at step S20 it reads in the pressure P of the compressed air from the pressure gage 17 provided at the air intake of the fuel cell 8.

At step S30, the control unit 20, based on the temperature T and the pressure P read from the temperature gage 18 and the pressure gage 17, reads in from the internal ROM a demanded humidity Hy assigned in the demanded humidity map that relates temperatures to humidities. This demanded humidity Hy is the ideal humidity for a maximum electrical generating efficiency in the fuel cell 8, and the electrical generating efficiency being maximum for a relative humidity of 60% to 100% in the air in the fuel cell 8. At a relative humidity of less than 60%, the electrical generating efficiency is reduced, and at over 100%, water condenses within the fuel cell 8, causing a loss of electrical generating efficiency.

At step S40, the air flow rate Ra is read in from the flow meter 16 provided at the air intake of the fuel cell 8. At step S50, the ideal quantity of water Rs is calculated by multiplying the air flow rate Ra by the demanded humidity Hy (Rs=Rx·Hy).

At step S60, a control quantity S for the water supply valve 11a is calculated, based on the ideal quantity of water Rs. Then, at step S70, a control signal is sent to the water supply valve 11a. In response to this control signal, the water supply valve 11a opens so as to supply water the ideal quantity of water from the pressure regulator 23 to inside the duct 10.

As a result, an effect of the first embodiment is that, by supplying water to the compressor 7, it is possible to reduce the leakage of compressed air from a gap in the screw within the compressor by sealing, thereby enabling an improvement in the volumetric efficiency. It is additionally possible to reduce wasteful compression caused by reverse flow of air within the compressor 7. With a rise in temperature, there is evaporation of water, so that there is a reduction in the temperature within the compressor because of latent heat of vaporization, thereby enabling a reduction in the compression work.

By measuring the air conditions at an air flow path that is as close as possible to the fuel cell 8, highly precise humidity control is performed, thereby enabling the maximum electrical generating efficiency in the fuel cell 8.

Because the exhaust temperature of the compressor 7 is reduced, it is possible to use an after-cooler having low capacity, thereby enabling a reduction in the size and weight of the after-cooler, in addition to achievement of a low pressure loss, thereby enabling high efficiency and low cost in the fuel cell system.

Figure 4:
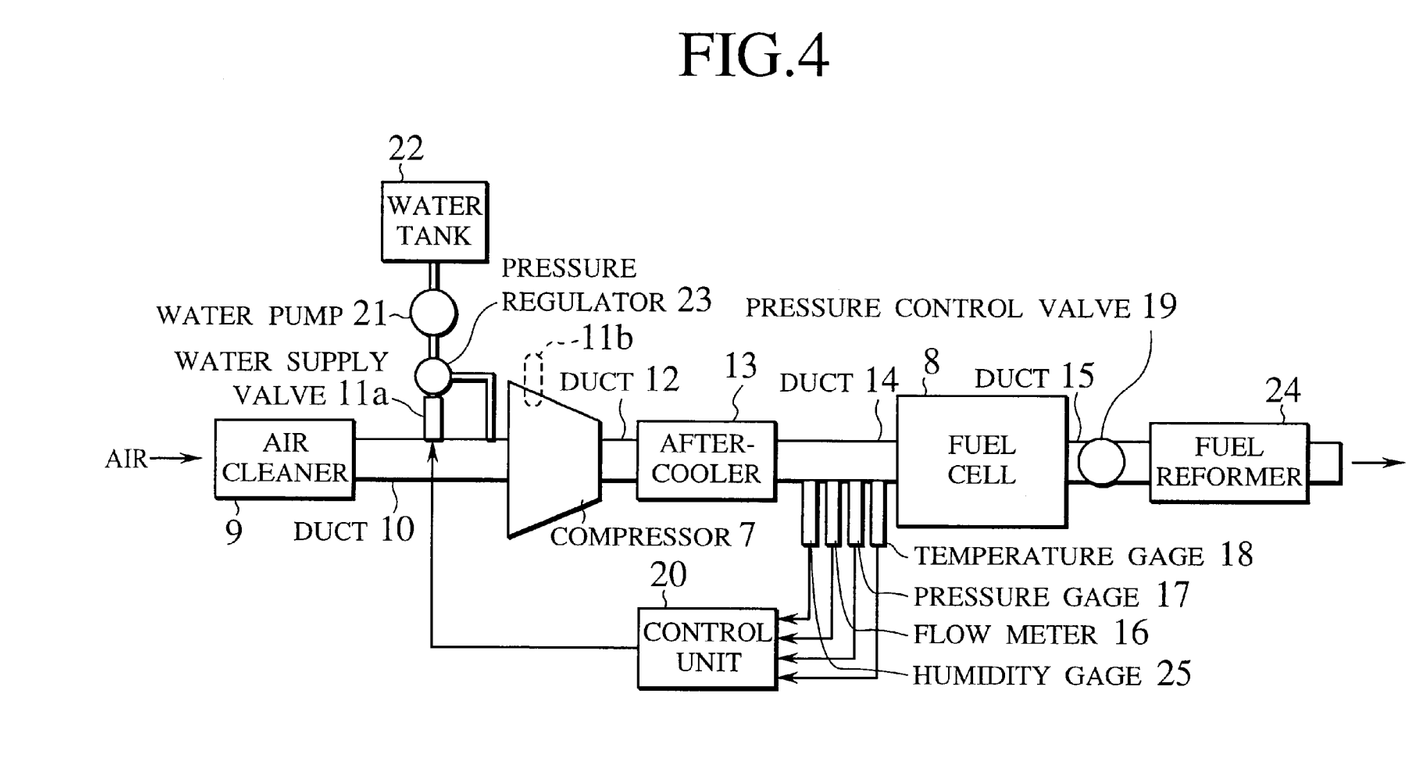
FIG. 4 is a block diagram showing fuel cell system in which a water supply system according to the second embodiment of the present invention is installed.

FIG. 4 shows a second embodiment of the present invention. In this second embodiment, the basic configuration is the same as the first embodiment shown in FIG. 1, with corresponding elements in FIG. 4 assigned the same reference numerals and not explicitly described herein.

A feature of the second embodiment is that, as shown in FIG. 4, a humidity gage 25 for detecting the humidity of the compressed air flowing in the duct is provided in duct 14 near the entrance of the fuel cell 8. This humidity gage 25 is connected to the control unit 20 controlling the fuel cell 8, and sends a measurement signal to the control unit 20. A correction coefficient map for correcting the quantity of water supply is written in overwritable form in a RAM provided in the control unit 20. The contents of the correction coefficient map are controlled so that all initial values are 1.

Figure 5:
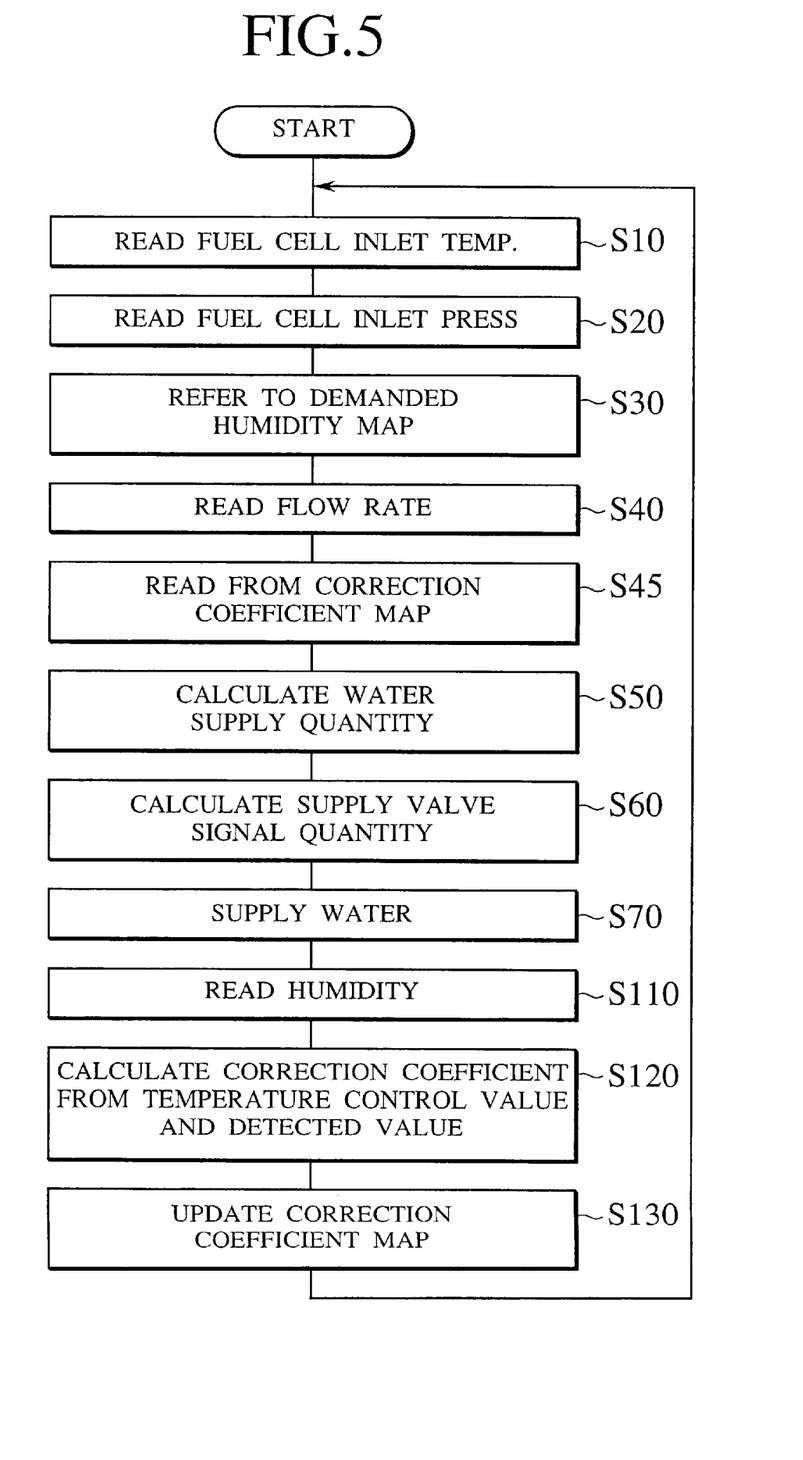
FIG. 5 is a flowchart illustrating the control operation in a water supply system according to the second embodiment of the present invention.

The control operation of this water supply system according to the flowchart of FIG. 5 is described below. The control flowchart of FIG. 5 is stored as a control program in an internal ROM of the control unit 20.

At step S10, the control unit 20 reads in the temperature T of the compressed air from the temperature gage 18 provided at the air intake of the fuel cell 8. Then, at step S20 it reads in the pressure P of the compressed air from the pressure gage 17 provided at the air intake of the fuel cell 8.

At step S30, the control unit 20, based on the temperature T and the pressure P read from the temperature gage 18 and the pressure gage 17, reads in from the internal ROM a demanded humidity Hy assigned in the demanded humidity map of FIG. 3 that relates temperatures to humidities.

At step S40, the air flow rate Ra is read in from the flow meter 16 provided at the air intake of the fuel cell 8.

At step S45, based on the temperature T and the pressure P read from the temperature gage 18 and the pressure gage 17, a correction coefficient k assigned to the correction coefficient map is read into an internal RAM.

At step S50, the ideal quantity of water Rs is calculated by multiplying the air flow rate Ra by the demanded humidity Hy (Rs=Rx·Hy).

Another calculation is made to determine the corrected ideal water quantity Rsh by multiplying the ideal water quantity by the correction coefficient k (Rsh=Rs·k).

At step S60, a control quantity for the water supply valve 11a is calculated, based on the correct ideal quantity of water Rsh. Then, at step S70, a control signal is sent to the water supply valve 11a. In response to this control signal, the water supply valve 11a opens so as to supply water the ideal quantity of water from the pressure regulator 23 to inside the duct 10.

At step S110, the detected value Hj of the humidity of the compressed air is read in from the humidity gage 25 provided at the air intake of the fuel cell 8.

Then, at step S120, a new correction coefficient k is calculated from the demanded humidity Hy and the detected value of humidity Hj (k=Hj/Hy).

At step S130, based on the temperature T and the pressure P used in steps S10 and S20, correction coefficient k assigned to the internal RAM correction coefficient map is updated to reflect the newly calculated coefficient k obtained at step S120. At this point, program control returns to step S10, from which the above processing is repeated.

By repeating the processing of steps S10 through S130, it is possible to correct the humidity of the air supplied to the fuel cell 8, thereby enabling the maintenance of constant ideal conditions.

As a result, in addition to achieving the same effect as the first embodiment the second embodiment has the added effect of reading the air humidity just before the fuel cell 8, and using this read value to perform feedback control of the quantity of water supplied, thereby enabling correction of the quantity of supplied water so as to compensate for the humidity within the fuel cell 8 and for deterioration of the water supply valve 11a with aging.

Figure 6:
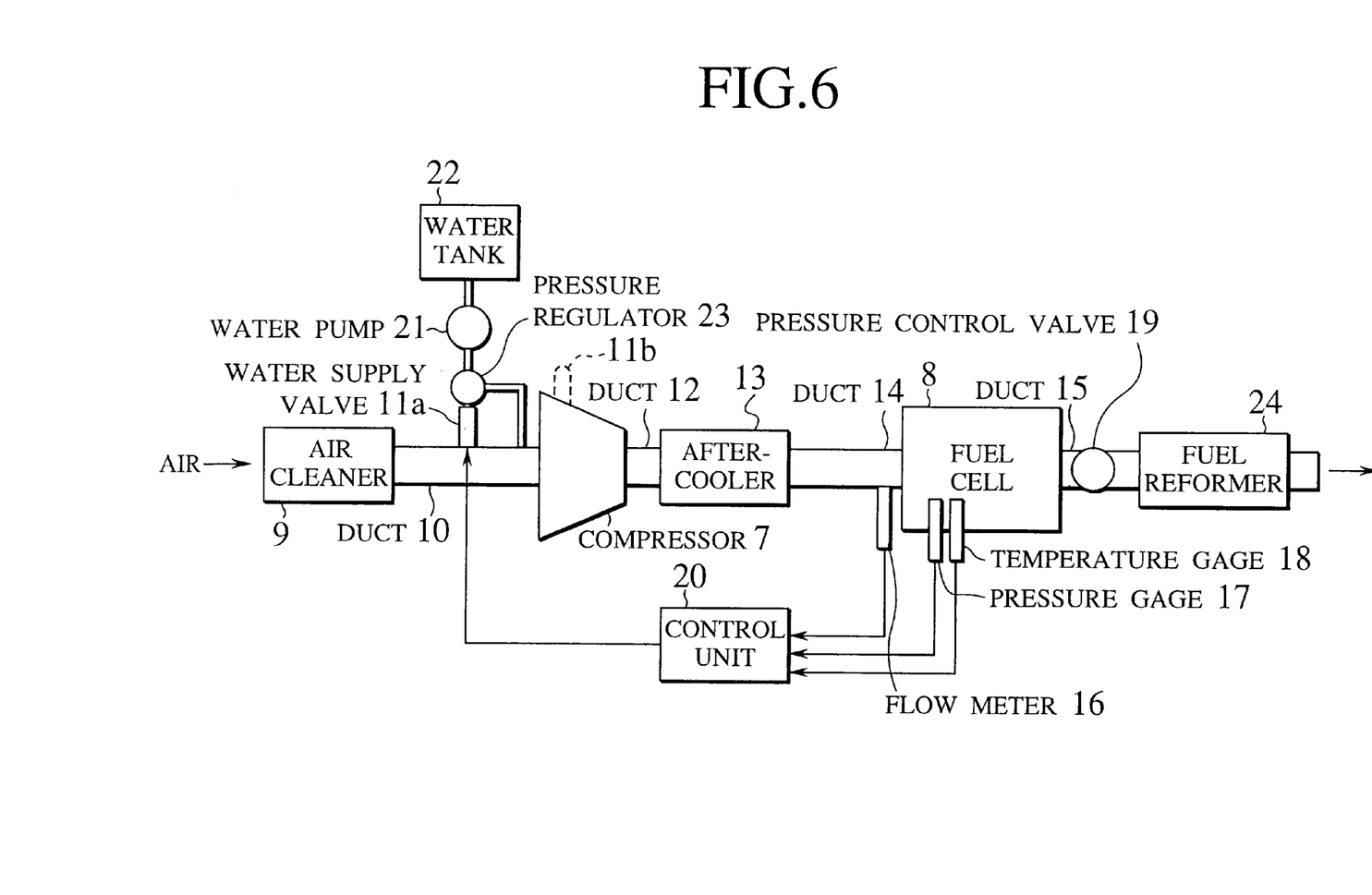
FIG. 6 is a block diagram showing fuel cell system in which a water supply system according to the third embodiment of the present invention is installed.

FIG. 6 shows a water supply apparatus for a fuel cell according to a third embodiment of the present invention.

The basic configuration of this embodiment is the same as the first embodiment shown in FIG. 1, with corresponding elements in FIG. 6 assigned the same reference numerals and not explicitly described herein.

A feature of the third embodiment, as shown in FIG. 6, is that the temperature gage 18 and the pressure gage 17 are provided internally in the fuel cell 8.

While the control operation of the compressor could be described according to the demanded humidity map of FIG. 3, with reference to the flowchart shown in FIG. 2, this operation is similar to the operation in the first embodiment, it will not described herein.

In addition to achieving the effect of the first embodiment, the third embodiment, by providing the temperature gage 18 and the pressure gage 17 within the fuel cell 8 enables measurement of the internal temperature and pressure within the fuel cell 8 itself, thereby enabling highly precise humidity control and the achievement of a further improved electrical generating efficiency.

Figure 7:
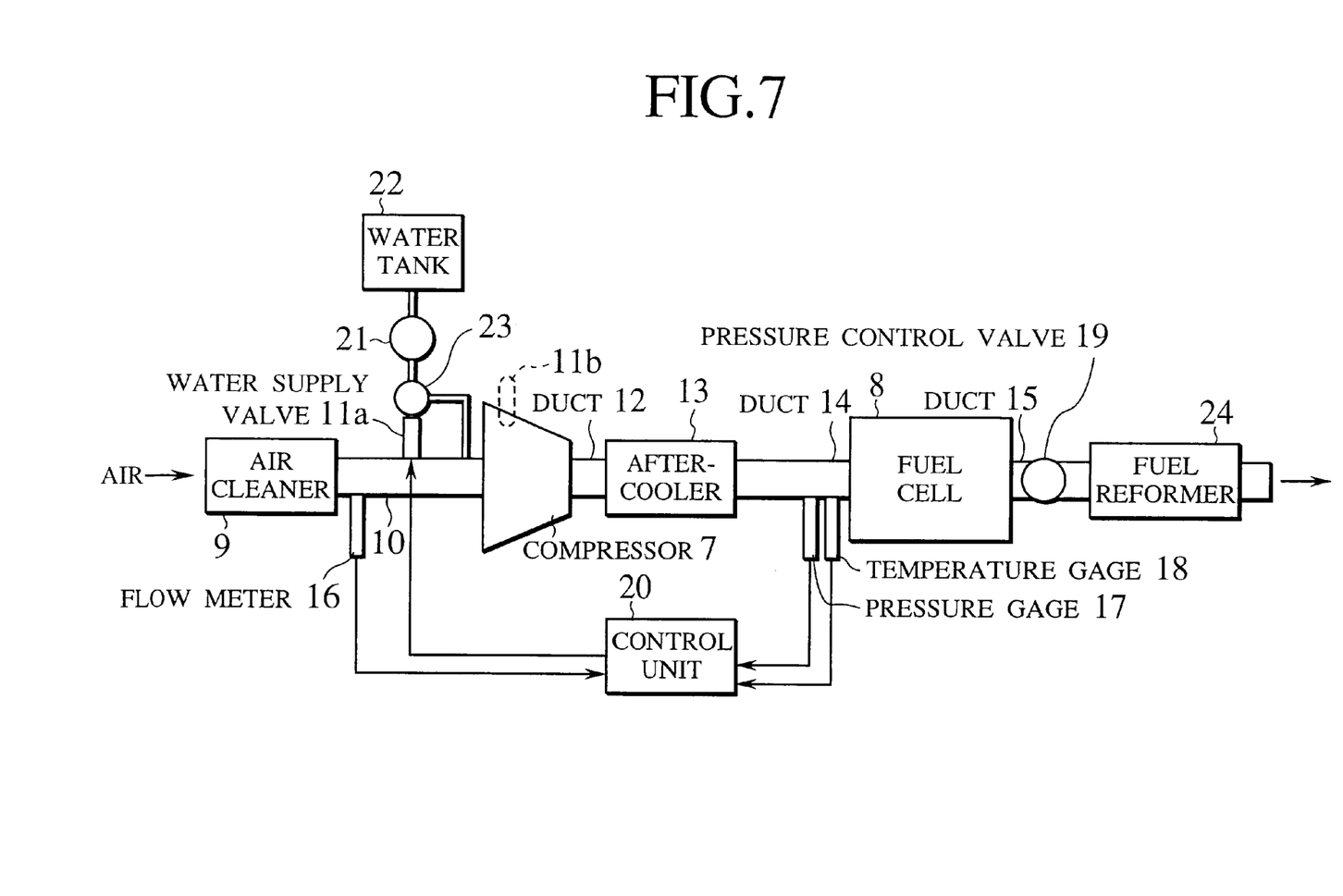
FIG. 7 is a block diagram showing fuel cell system in which a water supply system according to the fourth embodiment of the present invention is installed.

FIG. 7 shows a water supply system for a fuel cell according to a fourth embodiment of the present invention. The basic configuration of this embodiment is the same as the first embodiment shown in FIG. 1, with corresponding elements in FIG. 7 assigned the same reference numerals and not explicitly described herein.

A feature of the fourth embodiment, as shown in FIG. 7, is that the flow meter 16 is provided upstream from the water supply valve 11a of the air flow path.

While the control operation of the compressor could be described according to the demanded humidity map of FIG. 3, with reference to the flowchart shown in FIG. 2, this operation is similar to the operation in the first embodiment, it will not described herein.

In addition to achieving the effect of the first embodiment, the fourth embodiment, by providing the flow meter 16 upstream from the compressor 7 and the water supply valve 11a, the ranges of operating temperature and absolute humidity are made narrow, thereby improving the accuracy of the air flow measurement.

In a first aspect of the foregoing embodiments, a water supply system for supplying air to a fuel cell after cooling comprises a water supply valve for adjusting the quantity of water supplied when injecting water into an air intake path from a water tank, a compressor for taking in and compressing air after water injection, a cooler for cooling air delivered from the compressor, a detector for detecting the flow rate of compressed air supplied to the fuel cell, a detector for detecting the pressure of compressed air supplied to the fuel cell, a detector for detecting the temperature of compressed air supplied to the fuel cell, a means for calculating the ideally demanded quantity of water for the fuel cell, based on the flow rate, pressure, and temperature of the compressed air supplied to the fuel cell, and means for controlling the water supply valve so as to achieve the demanded quantity of water.

In a second aspect, the water quantity calculator has a means for calculating the ideally demanded humidity for the fuel cell, based on the detected pressure and temperature of the compressed air, and a means for calculating the ideally demanded quantity of water, based on the detected flow rate of compressed air and the demanded humidity. Accordingly, the ideally demanded humidity for the fuel cell is calculated based on the pressure and temperature of the compressed air, and the ideal quantity of demanded water is calculated based on the quantity of compressed air flow and this calculated humidity, thereby achieving highly precise humidity control.

In a third aspect, the water supply system further includes a humidity detector for detecting the humidity of the compressed air supplied to the fuel cell, wherein the water quantity calculator calculates the quantity of supplied water based on the humidity of the compressed air supplied to the fuel cell. Accordingly, the humidity of compressed air supplied to the fuel cell is detected, and a calculation is performed so as to correct the quantity of water supplied, based on the humidity of compressed air supplied to the fuel cell, thereby achieving the maximum possible electrical generating efficiency by correcting the quantity of water supplied to compensate for deterioration with aging.

In a fourth aspect, the temperature measurement means and pressure measurement means are provided within the fuel cell. Accordingly, by measuring the internal fuel cell temperature and pressure, highly precise humidity control and the maximum possible electrical generating efficiency are achieved.

In a fifth aspect, the flow rate measurement means is provided upstream from the water Supply valve Accordingly, by measuring the air flow rate in the air flow path upstream from the water supply valve, the ranges of operating temperature and absolute humidity are made narrow, thereby improving the accuracy of the air flow measurement.

The contents of Japanese Patent Application No. 11-126024 are incorporated herein by reference.

While preferred embodiments of the present invention have been described using specific terms, such description is for illustrative purposes, and it is to be understood that changes and variations may be made without departing from the spirit or scope of the following claims.

What is claimed is:

1. A water supply system for a fuel cell, comprising:

a water supply valve responsible for a supply quantity of water to be injected from a water tank into an air intake path;

a compressor compressing air taken from the air intake path after the water injection;

a cooler cooling compressed air delivered from the compressor to supply cooled air to the fuel cell;

a set of detectors detecting a flow rate, a pressure and a temperature of the compressed air to be supplied to the fuel cell;

a water quantity calculator calculating a necessary water quantity for the fuel cell based on detected flow rate, pressure and temperature of the compressed air to be supplied to the fuel cell, wherein if the detected pressure and temperature of the compressed air increases, then the calculated water quantity necessary for the fuel cell increases, and wherein the water quantity calculator comprises:
   (a) a calculator calculating an ideally demanded relative humidity for the fuel cell, based on the detected pressure and temperature of the compressed air; and
   (b) a calculator calculating an ideally demanded quantity of water, based on the detected flow rate of the compressed air and the demanded relative humidity, and a water quantity controller controlling the water supply valve to supply the necessary water quantity.

2. A water supply system according to claim 1, further comprising:

a detector detecting a relative humidity of the compressed air to be supplied to the fuel cell, wherein the water quantity calculator calculates the necessary water quantity based on a detected relative humidity of the compressed air to be supplied to the fuel cell.

3. A water supply system according to claim 1, wherein the fuel cell has therein one of the set of detectors detecting the temperature and another thereof detecting the pressure.

4. A water supply system according to claim 1, wherein if the detected pressure and temperature of the compressed air are higher, then the demanded relative humidity for the fuel cell is set to be higher in accordance with a demanded relative humidity map.

5. A water supply system according to claim 1, wherein the set of detectors is provided on the air intake path between the cooler and the fuel cell.

6. A water supply system according to claim 1, wherein when the detected pressure of the compressed air is higher, then the demanded relative humidity for the fuel cell is set to be higher.

7. A water supply system according to claim 1, wherein when the detected temperature of the compressed air is higher, then the demanded relative humidity for the fuel cell is set to be higher.

8. A water supply system according to claim 1, wherein the water quantity calculator comprises a demanded relative humidity map for setting the demanded relative humidity for the fuel cell, based on the detected pressure and/or detected temperature of the compressed air.

9. A water supply system according to claim 8, wherein the demanded relative humidity map comprises a relation in which the higher the detected pressure and/or detected temperature of the compressed air, the higher the demanded relative humidity.

10. A water supply system for a fuel cell, comprising:

a water supply valve responsible for a supply quantity of water to be injected from a water tank into an air intake path;

a compressor for compressing air taken from the air intake path after the water injection;

a cooler for cooling compressed air delivered from the compressor to supply cooled air to the fuel cell;

a set of detectors for detecting a pressure and a temperature of the compressed air to be supplied to the fuel cell;

a water quantity calculator for calculating a necessary water quantity for the fuel cell based on detected flow rate, pressure and temperature of the compressed air to be supplied to the fuel cell, wherein if the detected pressure and temperature of the compressed air increases, then the calculated water quantity necessary for the fuel cell increases, and wherein the water quantity calculator comprises:
 (a) a calculator for calculating an ideally demanded relative humidity for the fuel cell, based on the detected pressure and temperature of the compressed air; and
 (b) a calculator for calculating an ideally demanded quantity of water, based on the detected flow rate of the compressed air and the demanded relative humidity;

a water quantity controller for controlling the water supply valve to supply the necessary water quantity;

an air cleaner for cleaning the air taken from atmosphere; and a flow meter for measuring a flow rate of the air passing through the air cleaner, wherein the flow meter is located on the air intake path between the air cleaner and the water supply valve.

* * * * *